United States Patent
Poster et al.

(10) Patent No.: US 11,060,606 B2
(45) Date of Patent: Jul. 13, 2021

(54) SYSTEM AND METHOD FOR LOCATING AND CHARGING WIRELESS SENSORS

(71) Applicant: Textron Innovations Inc., Providence, RI (US)

(72) Inventors: Scott David Poster, Arlington, TX (US); Brian Edward Tucker, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 217 days.

(21) Appl. No.: 16/116,516

(22) Filed: Aug. 29, 2018

(65) Prior Publication Data
US 2020/0072339 A1 Mar. 5, 2020

(51) Int. Cl.
*F16H 57/08* (2006.01)
*B64D 35/00* (2006.01)
*F16H 1/28* (2006.01)

(52) U.S. Cl.
CPC ........... *F16H 57/082* (2013.01); *B64D 35/00* (2013.01); *F16H 1/28* (2013.01)

(58) Field of Classification Search
None
See application file for complete search history.

(56) References Cited

U.S. PATENT DOCUMENTS

| 2007/0130767 | A1* | 6/2007 | McCooey | F01D 25/34 29/889.2 |
| 2007/0178160 | A1* | 8/2007 | Burnett | A61B 17/12136 424/484 |
| 2017/0234421 | A1 | 8/2017 | Poster | |
| 2017/0318205 | A1 | 11/2017 | Duckett, III et al. | |

FOREIGN PATENT DOCUMENTS

EP 3202659 A1 8/2017

OTHER PUBLICATIONS

Greaves, et al., "Vibration Health or Alternative Monitoring Technologies for Helicopters," European Aviation Safety Agency (EASA), Research Project: (VHM), Final Report EASA_REP_RESEA_2012_6, 2012, 190 pages.

* cited by examiner

*Primary Examiner* — John R Wallace
(74) *Attorney, Agent, or Firm* — Slater Matsil, LLP

(57) ABSTRACT

In an embodiment, an apparatus includes: a gearbox including: a housing having an opening; an input pinion disposed in the housing; a moving feature mechanically coupled to the input pinion, the moving feature and the input pinion being operable to convert between power and torque; and first sensors disposed on the moving feature, the first sensors having batteries, where the moving feature is operable to rotate about a common axis, each of the first sensors being exposed by the opening as the moving feature rotates about the common axis.

20 Claims, 12 Drawing Sheets

SYSTEM AND METHOD FOR LOCATING AND CHARGING WIRELESS SENSORS

TECHNICAL FIELD

The present invention relates generally to wireless sensors, and, in particular embodiments, to a system and method for locating and charging sensors.

BACKGROUND

A rotorcraft may include one or more rotor systems including one or more main rotor systems. A main rotor system generates aerodynamic lift to support the weight of the rotorcraft in flight, and thrust to move the rotorcraft in forward flight. Another example of a rotorcraft rotor system is a tail rotor system. A tail rotor system may generate thrust in the same direction as the main rotor system's rotation to counter the torque effect created by the main rotor system. Rotorcraft include one or more engines powering the rotor systems. Gearboxes are used to convert between power and torque for the engines and the rotor systems.

SUMMARY

In an embodiment, a method includes: accessing an opening in a housing of a gearbox, the gearbox including moving features and fixed features, the gearbox further including a first sensor disposed on the moving features, the first sensor having a first battery; rotating the moving features of the gearbox to align the first sensor with the opening; inserting a portion of a charging unit in the opening of the housing; coupling a power transmitter of the charging unit with a first power receiver of the first sensor; and transmitting power to the first sensor, the transmitted power charging the first battery of the first sensor.

In some embodiments of the method, the opening has a longitudinal axis perpendicular to a major surface of the housing, and rotating the moving features of the gearbox includes: rotating the moving features of the gearbox until the first sensor is disposed on the longitudinal axis of the opening. In some embodiments of the method, the charging unit is a rigid borescope. In some embodiments of the method, the opening has a longitudinal axis perpendicular to a major surface of the housing, and after rotating the moving features of the gearbox, the first sensor is disposed off the longitudinal axis of the opening. In some embodiments of the method, the charging unit is an articulating borescope, and further including: steering the borescope towards the first power receiver of the first sensor, the first sensor having at least one guiding member indicating the location of the first power receiver. In some embodiments, the method further includes: while transmitting the power to the first sensor, communicating with the first sensor to determine a charge level and a health status of the first battery. In some embodiments of the method, the power transmitter of the charging and the first power receiver of the first sensor share a direct contact interface. In some embodiments of the method, the power transmitter of the charging and the first power receiver of the first sensor share a non-contact interface. In some embodiments, the method further includes: after transmitting the power to the first sensor, rotating the moving features of the gearbox to align a second sensor with the opening, the second sensor having a second battery; coupling the power transmitter of the charging unit with a second power receiver of the second sensor; and transmitting power to the second sensor, the transmitted power charging the second battery of the second sensor. In some embodiments, the method further includes: after transmitting the power to the first sensor and the second sensor, closing the opening in the housing of the gearbox.

In an embodiment, an apparatus includes: a gearbox including: a housing having an opening; an input pinion disposed in the housing; a moving feature mechanically coupled to the input pinion, the moving feature and the input pinion being operable to convert between power and torque; and first sensors disposed on the moving feature, the first sensors having batteries, where the moving feature is operable to rotate about a common axis, each of the first sensors being exposed by the opening as the moving feature rotates about the common axis.

In some embodiments of the apparatus, the opening is a dedicated opening for accessing the first sensors. In some embodiments of the apparatus, the opening is a lubrication port in the housing. In some embodiments, the apparatus further includes: a rotorcraft computer; a rotor mast connected to the moving feature of the gearbox; and an engine connected to the input pinion of the gearbox. In some embodiments of the apparatus, the gearbox further includes: second sensors disposed on the housing, where the first sensors are in wireless communication with the rotorcraft computer, and the seconds sensors are in wired communication with the rotorcraft computer. In some embodiments of the apparatus, the first sensors are vibration sensors. In some embodiments of the apparatus, the first sensors are temperature sensors. In some embodiments of the apparatus, the first sensors are debris sensors. In some embodiments of the apparatus, the first sensors are oil quality sensors.

In an embodiment, a borescope includes: an elongated member including conductive features running down the length of the elongated member; a main unit disposed at a first end of the elongated member; and a charging head unit disposed at a second end of the elongated member, the charging head unit and the main unit being electrically connected by the conductive features of the elongated member, the charging head unit including: a power transmitter, the power transmitter being operable to transmit power from the main unit to a sensor.

In some embodiments of the borescope, the charging head unit further includes: a camera, the camera operable to transmit video to the main unit; and a light source, the main unit operable to power the light source.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In accordance with some embodiments, a sensor is disposed on moving or rotating features of a rotorcraft gearbox. The gearbox may be a main transmission converting between power and torque for the main rotors and the rotorcraft engines. The sensor is accessible through a port in the housing of the gearbox, and may be accessed by rotating the transmission features to align the sensor with the port. A battery of the sensor may then be charged by coupling a sensor charger to the sensor. Multiple sensors may be disposed in the gearbox. Accessing the sensors through ports in the housing may allow the sensors to be charged without performing a costly rebuild of the gearbox.

Figure 1:
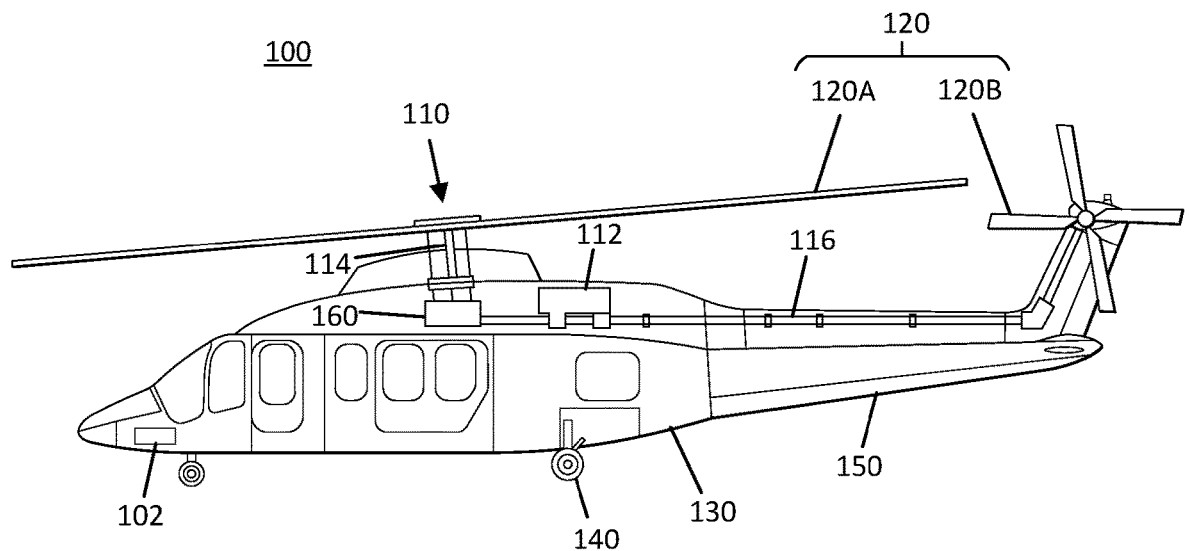
FIGS. 1 and 2 illustrate aspects of a rotorcraft, in accordance with some embodiment.
Figure 2:
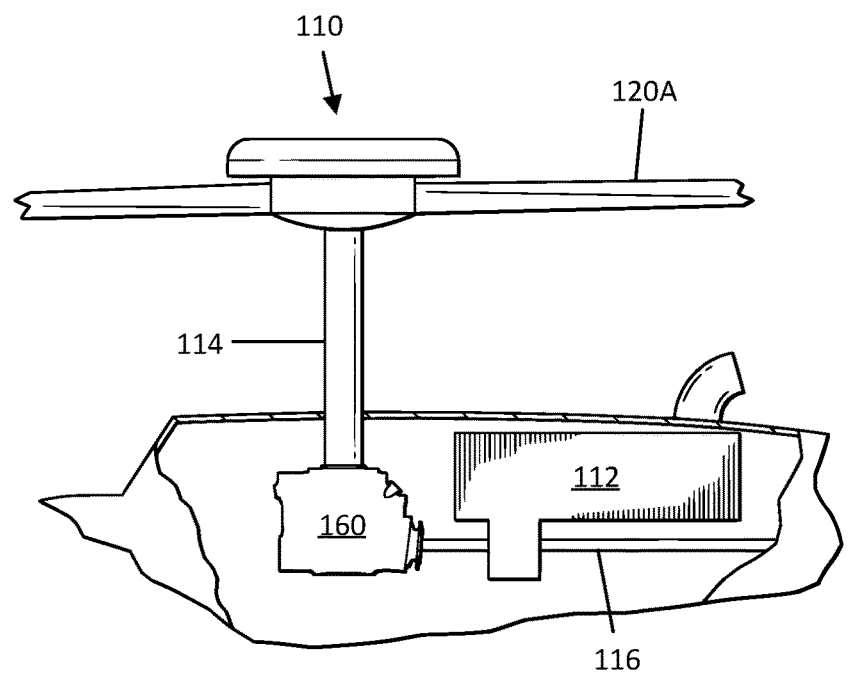

FIG. 1 illustrates a rotorcraft 100, in accordance with some embodiment. The rotorcraft 100 includes rotorcraft computers 102, a power train system no, rotor blades 120, a fuselage 130, landing gear 140, and an empennage 150. The rotorcraft computers 102 may be operable to collect data about, or control flight of, the rotorcraft 100. In some embodiments, the rotorcraft 100 is a fly-by-wire rotorcraft, and in such embodiments, the rotorcraft computers 102 may be flight control computers (FCCs) operable to execute one or more control laws (CLAWS) that control flight of the rotorcraft 100. The rotorcraft computers 102 may be operable to perform data collection and analysis as part of a health and usage monitoring system (HUMS). The rotor blades 120 include main rotor blades 120A and tail rotor blades 120B. The power train system 110 rotates the main rotor blades 120A and optionally the tail rotor blades 120B. FIG. 2 illustrates aspects of the power train system no, in accordance with some embodiments. The power train system no includes one or more engines 112, a gearbox 160, a rotor mast 114, and a tail rotor drive shaft 116. The engines 112 supply torque to the rotor mast 114 via the gearbox 160, thus rotating the main rotor blades 120A. The engines 112 may also supply torque to the tail rotor drive shaft 116, thus rotating the tail rotor blades 120B. The gearbox 160 may be a main rotor transmission system. It should be appreciated that the power train system 110 may include more gearboxes or other types of gearboxes than the gearbox 160 shown. The power train system no may include a swashplate (not shown) for collectively or cyclically controlling the pitch of each of the main rotor blades 120A in order to selectively control direction, thrust, and lift of rotorcraft 100.

The fuselage 130 represents the body of the rotorcraft 100 and may be coupled to the power train system 110 such that the power train system 110 and rotor blades 120 move the fuselage 130 through the air during operation. The landing gear 140 supports the rotorcraft 100 when the rotorcraft 100 is grounded. The empennage 150 represents the tail section of the aircraft and is connected to the tail rotor blades 120B. The power train system no and tail rotor blades 120B may collectively provide thrust in the same direction as the rotation of the main rotor blades 120A, so as to counter torque effects created by the main rotor blades 120A.

It should be appreciated that teachings from the rotorcraft 100 may apply to aircraft other than rotorcraft, such as airplanes, tilt rotor aircraft, and unmanned aircraft, to name a few examples. In addition, teachings of certain embodiments relating to rotor systems described herein may apply to the power train system no or other power train systems, including but not limited to non-rotorcraft power train systems.

The gearbox 160 transmits power from the engines 112 to the main rotor blades 120A and tail rotor blades 120B. The gearbox 160 converts between power and torque for a power source (e.g., the engines 112) and an object to be moved (e.g., the rotor blades 120). The gearbox 160 is operable to reduce the power output by the engines 112 and increase the torque applied to the rotor blades 120.

Figure 3A:
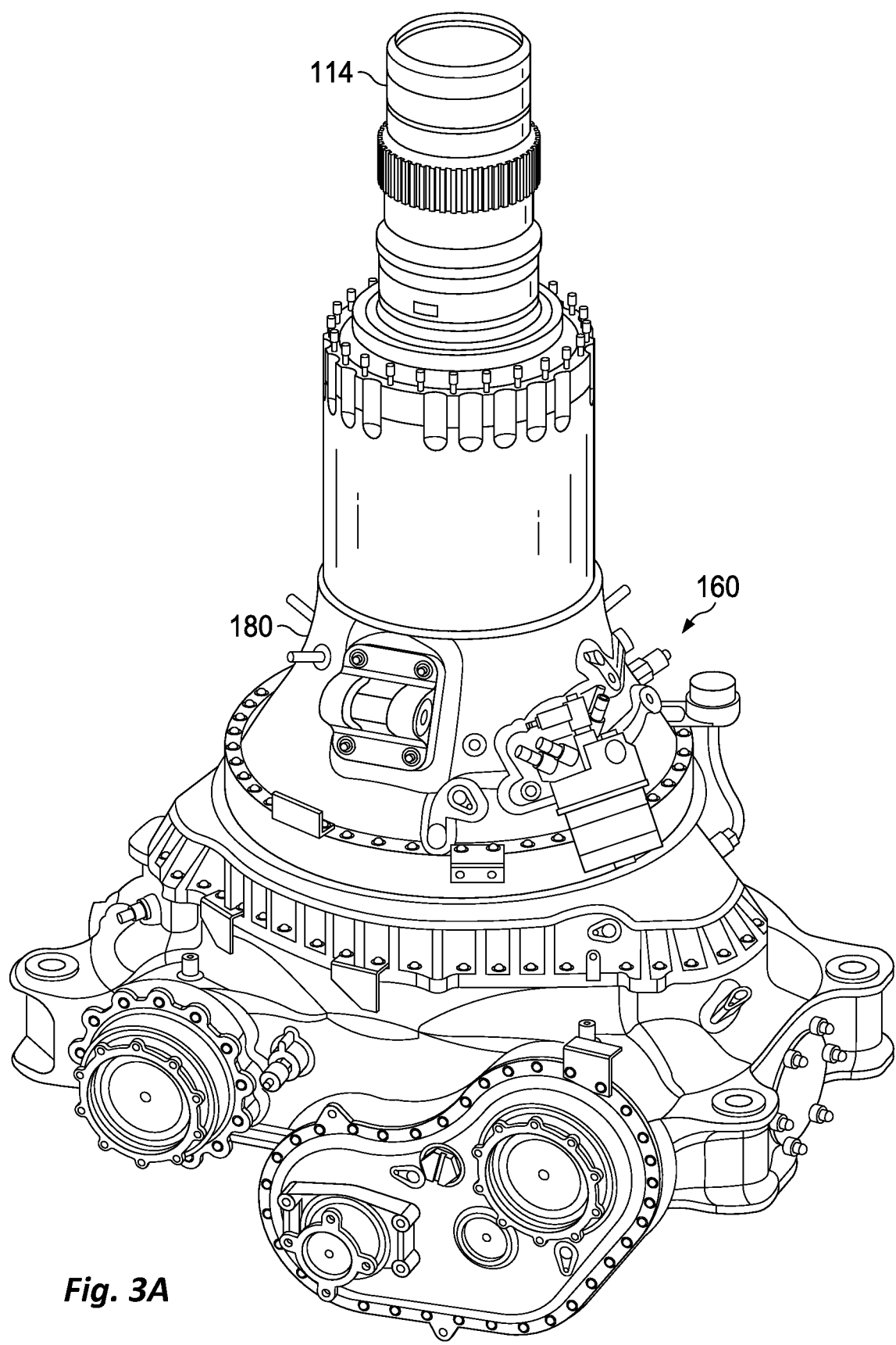
FIGS. 3A and 3B illustrate aspects of a gearbox, in accordance with some embodiments.
Figure 3B:
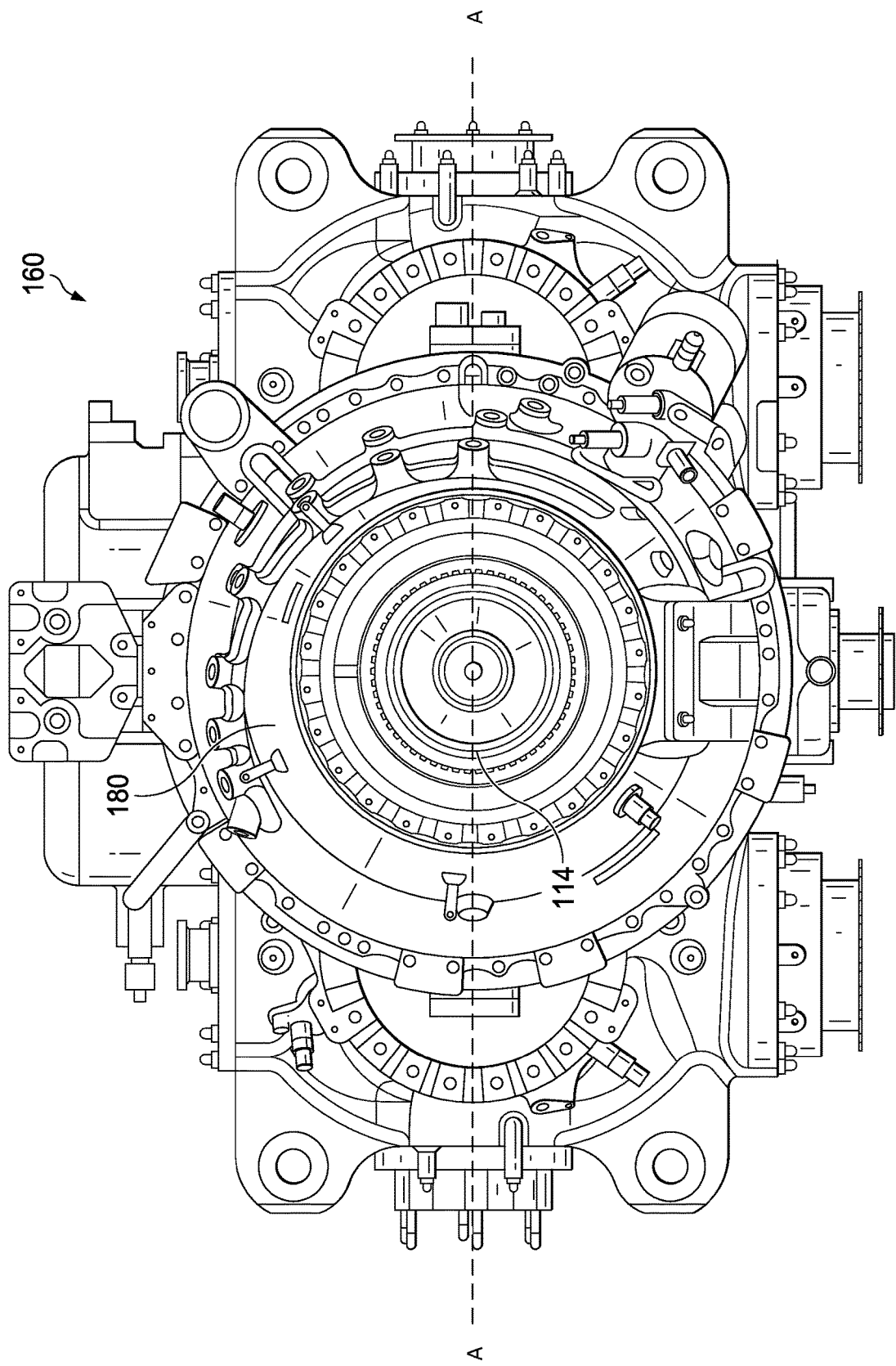

FIGS. 3A and 3B illustrate aspects of the gearbox 16o, in accordance with some embodiments. FIG. 3A is a perspective view of the gearbox 160, and FIG. 3B is a top-down view of the gearbox 160. In the embodiment shown, the gearbox 160 is a gearbox for the main rotor system, and includes (or is coupled to) a rotor mast 114. The gearbox 160 is operable to rotate the rotor mast 114 about an axis of rotation 195. A reference cross-section A-A, which is used in later figures, is illustrated across the rotor mast 114 in FIG. 3B. The gearbox 160 includes a gearbox housing 180, with various gears (discussed below) disposed therein. A gear is a rotating part having teeth that mesh with another toothed part in order to transmit rotational energy. The gears within the gearbox 160 accomplish power and torque conversions that are desired for a given implementation. For instance, the embodiment shown reduces the rotational speed output from the engines 112 and increases the torque output from the engines 112, with the engine outputs being applied to the rotor blades 120 of the rotorcraft 100, such as to the rotor mast 114.

Figure 4A:
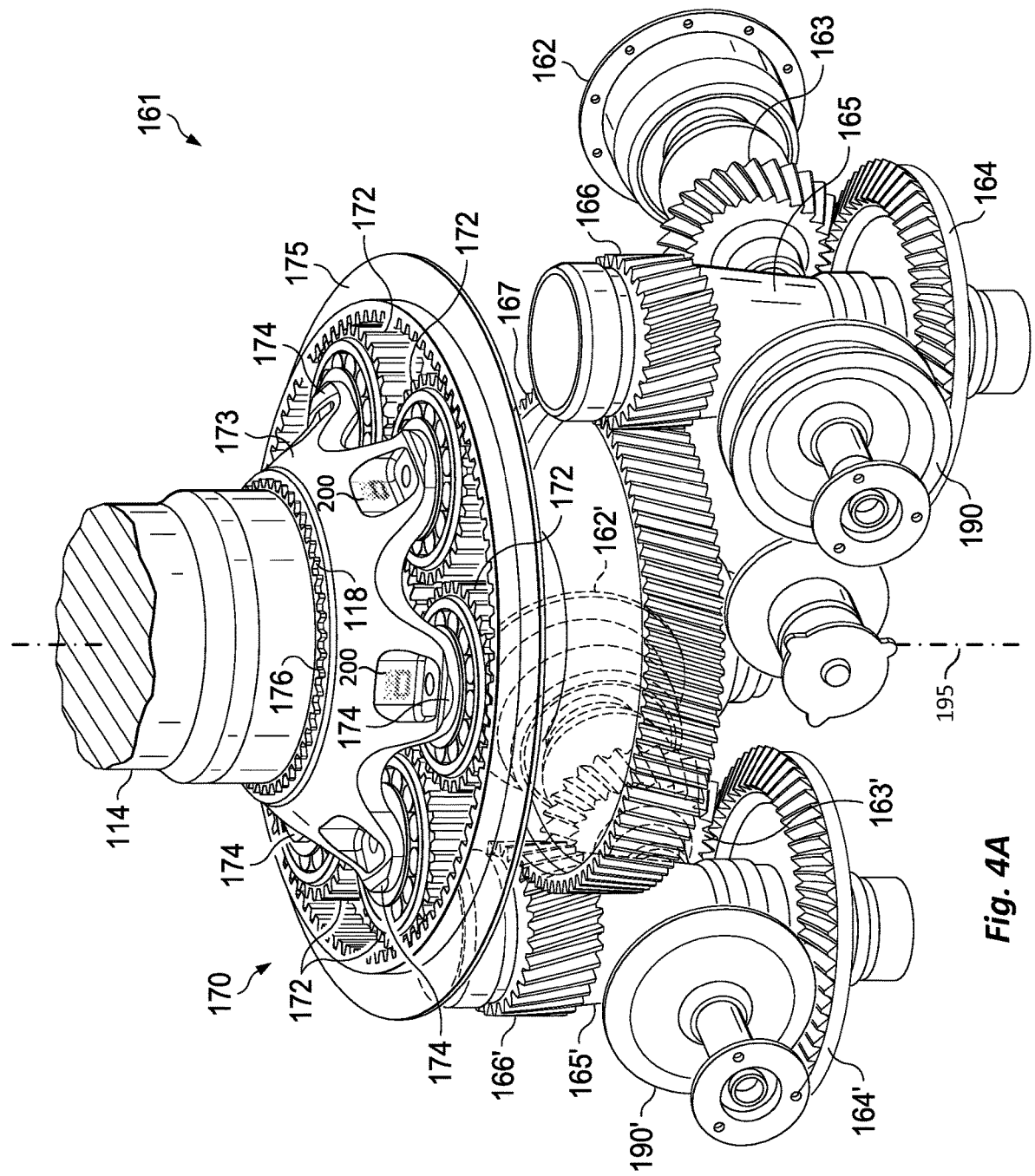
FIGS. 4A and 4B illustrate further aspects of a gearbox, in accordance with some embodiments.
Figure 4B:
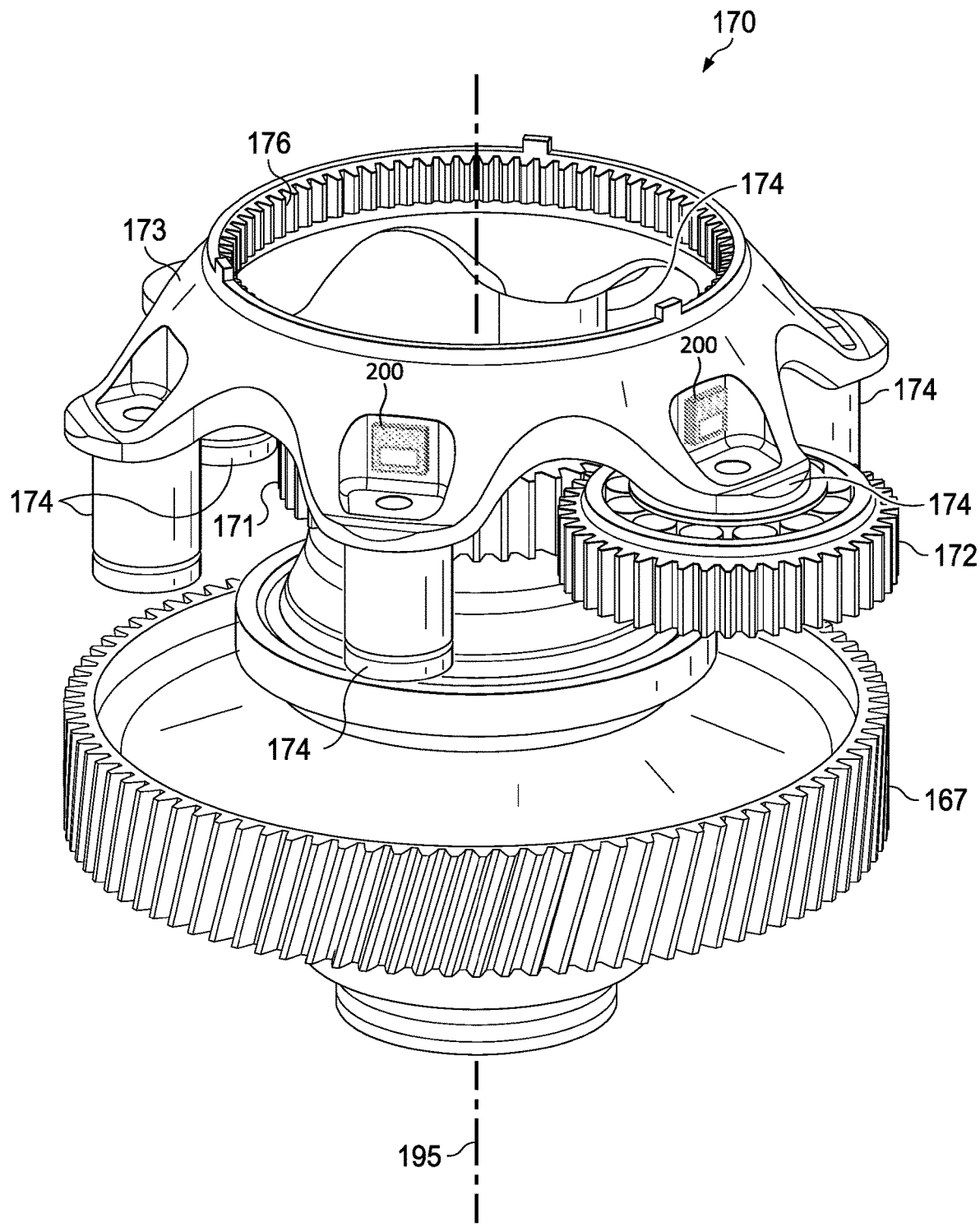

FIGS. 4A and 4B illustrate further aspects of the gearbox 160, in accordance with some embodiments. The gearbox 160 includes a gear train 161 (shown in FIG. 4A), which includes a planetary gear set 170 (shown in FIG. 4B). The gear train 161 is contained within the gearbox housing 180. The gear train 161 includes an input pinion 162. The input pinion 162 is in mechanical communication with, and receives rotational energy from, the engines 112. The input pinion 162 includes a helical bevel gear portion 163. The helical bevel gear portion 163 of the input pinion 162 meshes with, and transmits rotational energy to, a bevel gear 164. The bevel gear 164 may be, e.g., a helical bevel gear. The bevel gear 164 meshes with and drives an accessory drive gear 190, which may be used to provide rotational energy to an accessory gearbox (not shown) and/or various aircraft accessories (not shown). In embodiments where the gearbox 160 is a gearbox for the main rotor blades 120A, the accessory gearbox may be a gearbox for the tail rotor blades 120B. The aircraft accessories may include air blowers, cooling fans, lubrication pumps, hydraulic pumps, electrical generators, and/or the like. The bevel gear 164 is also attached to a helical spur gear 166 via a common shaft 165. Thus, the bevel gear 164, common shaft 165, and helical spur gear 166 rotate together about a common axis. Torque applied to the bevel gear 164 is transmitted via the common shaft 165 to the helical spur gear 166. The helical spur gear 166 meshes with, and transmits rotational energy to, a bull gear 167. The bull gear 167 is integral with a sun gear 171 of the planetary gear set 170. Thus, torque applied to the bull gear 167 is transmitted to the sun gear 171.

The power train system 110 may include more than one of the engines 112, such as two engines 112, which may increase redundancy of the power train system no. In such embodiments, the gear train 161 further includes a second input pinion 162', a second helical bevel gear portion 163', a second bevel gear 164', a second common shaft 165', a second helical spur gear 166', and a second accessory drive gear 190', each of which may be similar to its previously-described counterpart. Descriptions will not be repeated herein. Rotational energy provided at either or both of the input pinions 162 and 162' is ultimately combined at the bull gear 167 and transmitted to sun gear 171.

In the planetary gear set 170, the sun gear 171 is a straight-cut spur gear that meshes with, and transmits rotational energy to, a plurality of planet gears 172. The planet gears 172 are rotatably mounted to a planetary carrier 173. The planetary gear set 170 may have any number of planet gears 172, and in the embodiment of FIG. 4A has six planet gears 172. Only one planet gear 172 is shown in FIG. 4B, for clarity. The planetary carrier 173 includes a plurality of posts 174, each of which is configured to receive one of the plurality of planet gears 172. Each of the posts 174, therefore, defines the rotational axis for a corresponding planet gear 172 rotatably mounted thereon. The planetary carrier 173 is an overhung planetary carrier, having a plurality of downwardly-extending, cantilevered posts 174. It should be appreciated that the components of the planetary gear set 170 (e.g., the planetary carrier 173) may have other configurations and orientations. For instance, in some embodiments, the planetary carrier 173 may instead include a lower plate, an upper web, and planetary posts extending between the lower plate and upper web.

Each of the planet gears 172 meshes with a ring gear 175. The ring gear 175 is stationary. For example, the ring gear 175 may be fixedly mounted in or on the gearbox housing 180, and does rotate with respect to the gearbox housing 180. The planetary carrier 173 establishes spatial relationships among the sun gear 171, planet gears 172, and ring gear 175. In particular, each of the planet gears 172 meshes with both the sun gear 171 and the ring gear 175. Because the sun gear 171 rotates while the ring gear 175 is fixed, the planet gears 172 travel on an orbiting path about the sun gear 171 as they rotate on the posts 174. The orbiting action causes the planetary carrier 173 to rotate.

The planetary carrier 173 includes internal splines 176. The internal splines 176 mesh with mating external splines 118 on the rotor mast 114. Thus, the planetary carrier 173 serves as the main output for the gearbox 160, and transmits rotational energy to the rotor mast 114. The bull gear 167, sun gear 171, planetary carrier 173, and rotor mast 114 are all operable to rotate about a substantially common axis of rotation 195.

Sensors 200 are disposed on the components of the gearbox 160. Notably, the sensors 200 may be disposed on either fixed features or moving features of the gearbox 160. An example of a fixed feature is the gearbox housing 180. An example of a moving feature is the planetary gear set 170 and its components. In the embodiment shown, the sensors 200 are disposed on sidewalls of the planetary carrier 173, adjacent to portions of the planetary carrier 173 that are connected to the posts 174. It should be appreciated that the sensors 200 may be disposed on other moving features, such as any components of the planetary gear set 170. For example, the sensors 200 may be disposed on a major surface of the bull gear 167, a major surface of the sun gear 171, other surfaces of the planetary carrier 173, or the like. Further, the sensors 200 may be disposed on a combination of fixed and moving features. The sensors 200 may be sealed devices that are capable of operating in a fluid, such as in oil of the gearbox 160.

The gearbox 160 converts a large amount of power to torque. In some embodiments, the engines 112 provide as much as 2500 horsepower to the gearbox 160. As such, moving features of the gearbox 160 may fail sooner than fixed features of the gearbox 160. Because the sensors 200 are attached to the moving features of the gearbox 160, they may be more capable of detecting problems with the moving features than sensors attached on the fixed features of the gearbox 160 (e.g., the gearbox housing 180). In particular, the sensors 200 may be able to directly measure certain operating conditions of the moving features, while sensors attached to the gearbox housing 180 may only be able to indirectly measure those operating conditions, e.g., through the use of signal processing.

The sensors 200 may be any type of sensors, such as vibration sensors, temperature sensors, debris sensors, oil quality sensors, or the like. In embodiments where the sensors 200 are vibration sensors, they may be operable to measure vibration levels of the components of the gearbox 160. Vibrations levels in excess of a threshold may indicate a failure condition of the gearbox 160. In embodiments where the sensors 200 are temperature sensors, they may be operable to measure to ambient temperatures, such as oil temperatures of the gearbox 160. Temperatures in excess of a threshold may also indicate a failure condition. In embodiments where the sensors 200 are debris sensors, they may detect impurities in the ambient environment of the gearbox 160. The presence of debris may also indicate a failure condition. In embodiments where the sensors 200 are oil quality sensors, they may be operable to measure characteristics of the gearbox oil, such as the amount of water in the oil, the acidity of the oil, the amount of air or foam in the oil, or the like. Oil characteristics in excess of a threshold may also indicate a failure condition.

The sensors 200 attached to the moving features of the gearbox 160 move during operation, and are wireless, battery-powered sensors that have no connecting wires for power or data transmission. Conversely, the sensors 200 attached to the fixed features of the gearbox 160 may have connecting wires. The sensors 200 are operable to communicate with, e.g., the rotorcraft computers 102 of the rotorcraft 100. Transduced signals from the sensors 200 may be used by CLAWS to control flight of the rotorcraft 100, or may be used by HUMS to collect and analyze usage data for the rotorcraft 100. Although the sensors 200 may be capable of wirelessly communicating with the rotorcraft computers 102, wireless charging of the sensors 200 may not be feasible due to the distance between the sensors 200 and the exterior of the gearbox 160. Notably, in wireless charging systems, the wireless power transmitted over a non-contact interface is inversely proportional to the square of the interface distance. Thus, although wireless data transmission may be accomplished over longer distances and through materials (e.g., through the gearbox housing 180), closer distances may be desired for efficient wireless power transmission.

The gearbox 160 may be regularly rebuilt as part of aircraft maintenance. Rebuilding the gearbox 160 is a costly maintenance procedure. When the sensors 200 are battery-powered, they may be recharged during a rebuild of the gearbox 160. However, the battery life of the sensors 200 may be shorter than the typical time between rebuilds of the gearbox 160. In particular, the sensors 200 may be used during each flight of the rotorcraft 100, and so the batteries of the sensors 200 may discharge before the gearbox 160 is scheduled for rebuild. Because rebuilding the gearbox 160 is a costly maintenance procedure, disassembling the gearbox 160 to charge the batteries of the sensors 200 may be undesirable.

Figure 5:
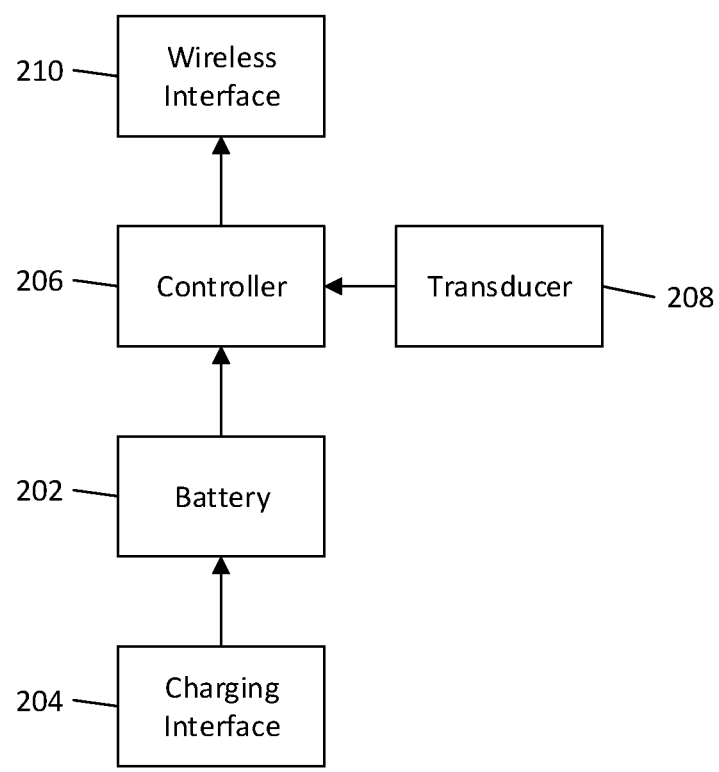
FIG. 5 is a block diagram of a gearbox sensor, in accordance with some embodiments.

FIG. 5 is a block diagram of one of the sensors 200, in accordance with some embodiments. The sensors 200 include a battery 202, a charging interface 204, a controller 206, a transducer 208, and a wireless interface 210. The battery 202 may be any type of embedded battery, such as a lithium-ion battery or a NiMH battery.

The charging interface 204 receives power and charges the battery 202, and is part of a power receiver. The charging interface 204 may be a direct contact or a non-contact interface. A direct contact interface is one where the power source and charging interface 204 are in a direct conductive path, and the charging interface 204 has terminals that the power source physically and electrically couples. An example of a direct contact interface is a universal serial bus (USB) port, such as a micro-USB port. A non-contact interface is one where the power source and charging interface 204 are in a non-conductive path, such as a transmission path of a magnetic field (e.g., inductive coupling) or an electric field (e.g., capacitive coupling). The non-conductive path may be a transmission path of electromagnetic radiation, such as microwaves or laser beams. An example of a non-contact interface is the Qi interface. In embodiments where the sensors 200 operate in a fluid environment, such as below the oil level of the gearbox 160, the charging interface 204 is a non-contact interface. In embodiments where the sensors 200 operate in air or a vacuum environment, such as above the oil level of the gearbox 160, the charging interface 204 may be either a direct contact or non-contact interface. When the charging interface 204 is a non-contact interface, the distance between the charging interface 204 and a charging unit may be small during charging operations. A short interface distance allows the inductive coupling elements (e.g., wire loops) or capacitive coupling elements (e.g., active electrodes) of the charging interface 204 to be small. In some embodiments, the receiving circuits and the inductive or capacitive coupling elements of the charging interface 204 are formed in a single integrated circuit or are packaged in a same die package, allowing the size of the antennas (and thus the size of the overall device) to be reduced.

The controller 206 is powered by the battery 202. The controller 206 receives transduced signals from a transducer 208, and transmits the signals over the wireless interface 210, e.g., to the rotorcraft computers 102. The controller 206 may be any type of controller, such as a microprocessor, a microcontroller, an application-specific integrated circuit, a field programmable gate array, or the like. The transducer 208 may be any type of transducer that is acceptable for the desired type of sensors. When the sensors 200 are temperature sensors, the transducer 208 may be a diode, thermistor, resistance temperature detector, thermocouple, or the like. When the sensors 200 are vibration sensors, the transducer 208 may be an accelerometer, a gyroscope, or the like. When the sensors 200 are debris sensors, the transducer 208 may include a moving magnet and two electrodes, which produce a transduced signal indicating the presence of metallic debris between the electrodes. Alternatively, the transducer 208 may be operable to produce a Gaussian field and detect interruptions in the Gaussian field, indicating the presence of metallic or non-metallic debris. When the sensors 200 are oil quality sensors, the transducer 208 may be an electrochemical pH sensing element having a measuring electrode and a reference electrode, a moisture detector such as a variable resistor, combinations thereof, or the like. The wireless interface 210 may be, e.g., a RF interface, and may include an antenna for transmission to a receiving device such as the rotorcraft computers 102.

Figure 6:
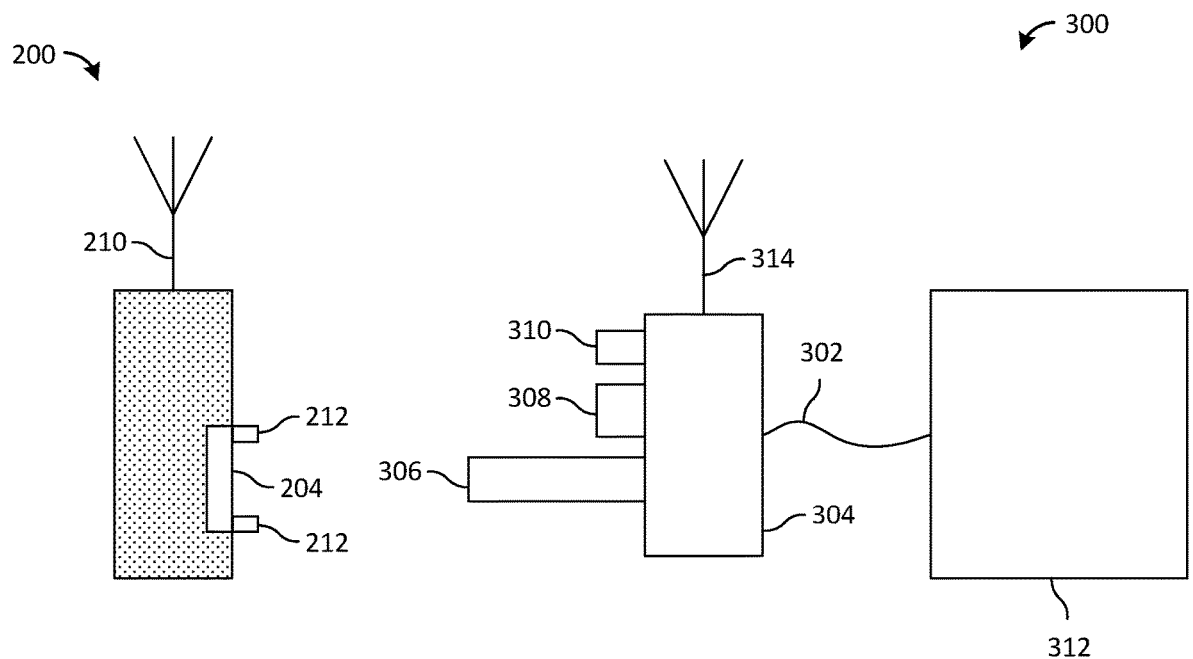
FIG. 6 is a block diagram of a gearbox sensor charging system, in accordance with some embodiments.

FIG. 6 is a block diagram of a gearbox sensor charging system, in accordance with some embodiments. A charging unit 300 is shown, which may be used to charge the sensors 200. The charging unit 300 may be a borescope, such as a rigid borescope or an articulating borescope. The charging unit 300 includes an elongated member 302. The elongated member 302 may be rigid or may be flexible. A charging head unit 304 is disposed at a first end of the elongated member 302. The charging head unit 304 includes a charging interface 306, which is part of a power transmitter. The charging interface 306 is compatible with the charging interface 204, and is operable to charge the battery 202 when the charging interfaces 204 and 306 are coupled. The coupling may be physical coupling, electrical coupling, or magnetic coupling, depending on whether the charging interfaces are direct contact or non-contact interfaces. The sensors 200 may optionally include guiding members 212, which may be a cone, a light emitting diode (LED), a marking, a magnet, or the like, to aid with physically or visually locating the charging interface 204. The charging head unit 304 optionally includes a camera 308 and a light source 310, which may aid an operator in guiding the charging head unit 304 towards the charging interface 204, with (or without) the help of the guiding members 212. In some embodiments, the charging head unit 304 further includes a magnet, which mates with the guiding members 212 when they are magnetic.

The charging head unit 304 may be operated using a main unit 312, which may be a dedicated console, a computer, or an embedded device. The main unit 312 is disposed at a second end of the elongated member 302, and is connected to the charging head unit 304 by the elongated member 302, e.g., with conductive features (such as wires) disposed in and running down the length of the elongated member 302. The main unit 312 may be battery powered. The main unit 312 may include a display for viewing footage received from the camera 308, may provide power to the charging interface 306 for transmission to the sensors 200, and may provide power to the light source 310. In some embodiments, the elongated member 302 is flexible, and may be steered or articulated by the main unit 312. For example, the main unit 312 may include controls for steering the charging head unit 304 during operation. In some embodiments, the main unit 312 may be operable to automatically steer the charging head unit 304. For example, the main unit 312 may detect the guiding members 212 and may steer the charging head unit 304 according to the relative positions of the guiding members 212 and charging head unit 304. The detection may be, e.g., optical detection by the camera 308, such as optical recognition of the guiding members 212 when the guiding members 212 are markings or LEDs.

Optionally, the charging unit 300 includes a wireless interface 314, which may be part of the charging head unit 304 or the main unit 312. The wireless interface 314 may be operable to communicate with the wireless interface 210, which may be before, during, or after charging. In some embodiments, the charging unit 300 communicates with the sensors 200, to determine the charge of the battery 202, the health status of the battery 202, or the like. The charging unit 300 may transmit power to the sensors 200 until it determines charging of the battery 202 is complete. In some embodiments, the charging head unit 304 and main unit 312 both include a wireless interface, with the wireless interface of the charging head unit 304 being operable to communicate with the sensors 200, and the wireless interface of the main unit 312 being operable to communicate with another device, such as a device used by maintenance crew.

Figure 7:
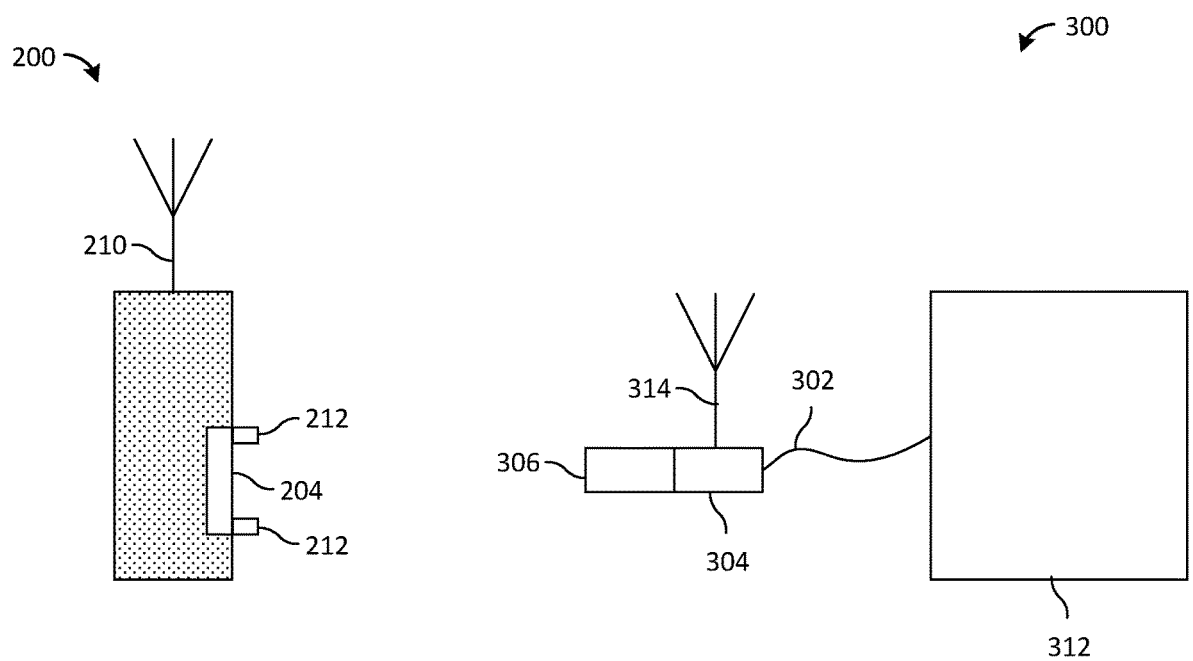
FIG. 7 is a block diagram of a gearbox sensor charging system, in accordance with some other embodiments.

FIG. 7 is a block diagram of a gearbox sensor charging system, in accordance with some other embodiments. In this embodiment, the charging unit 300 does not include the camera 308 or light source 310. Further, the elongated member 302 is rigid, and is part of a rigid borescope. Because the charging unit 300 omits some features, it may be less costly.

FIGS. 8A through 9B are cross-sectional views of the gearbox 160, in accordance with various embodiments. FIGS. 8A through 9B are shown along cross-section A-A of FIG. 3B. The sensors 200 are shown disposed on sidewalls of the planetary carrier 173, although it should be appreciated that the sensors 200 may be disposed on other surfaces of the planetary carrier 173, or on different components of the planetary gear set 170.

Figure 8A:
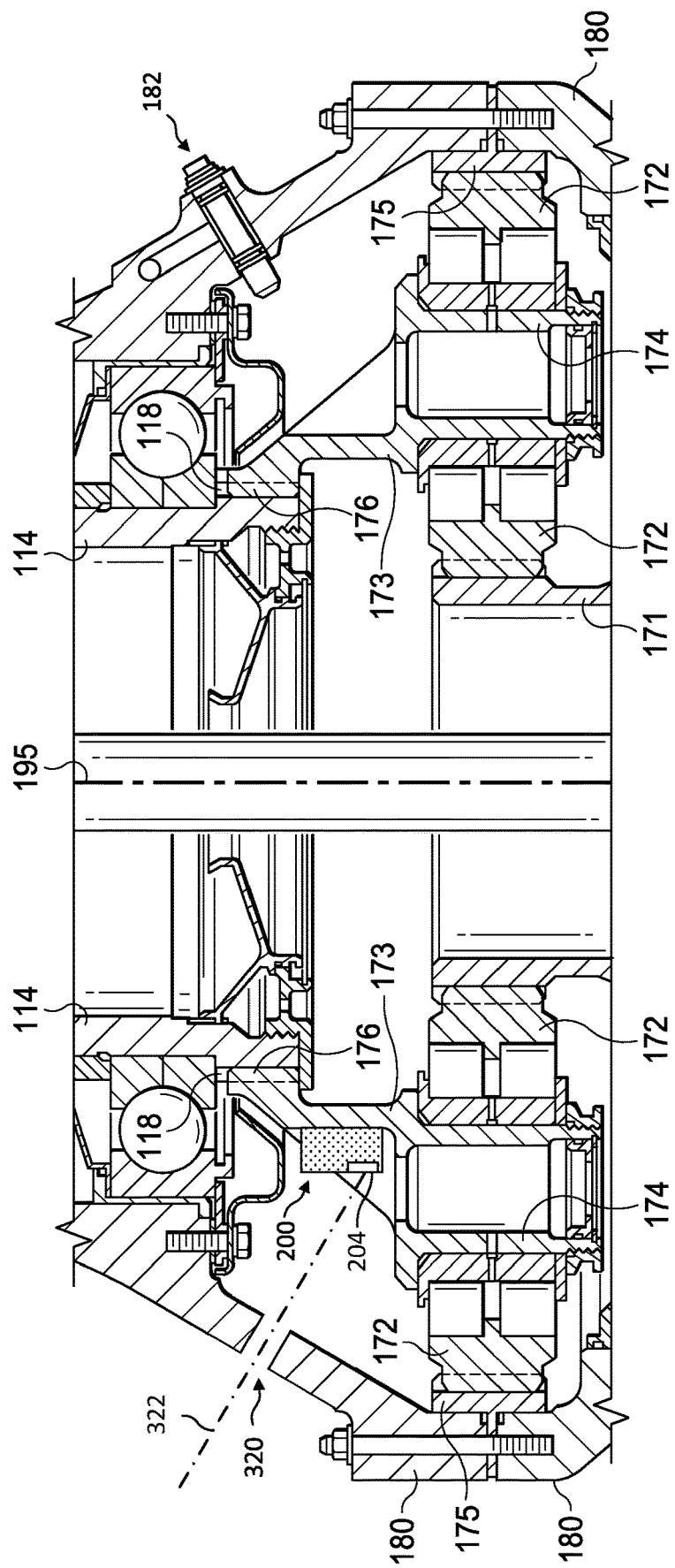
FIGS. 8A through 9B are cross-sectional views of a gearbox, in accordance with various embodiments.
Figure 8B:
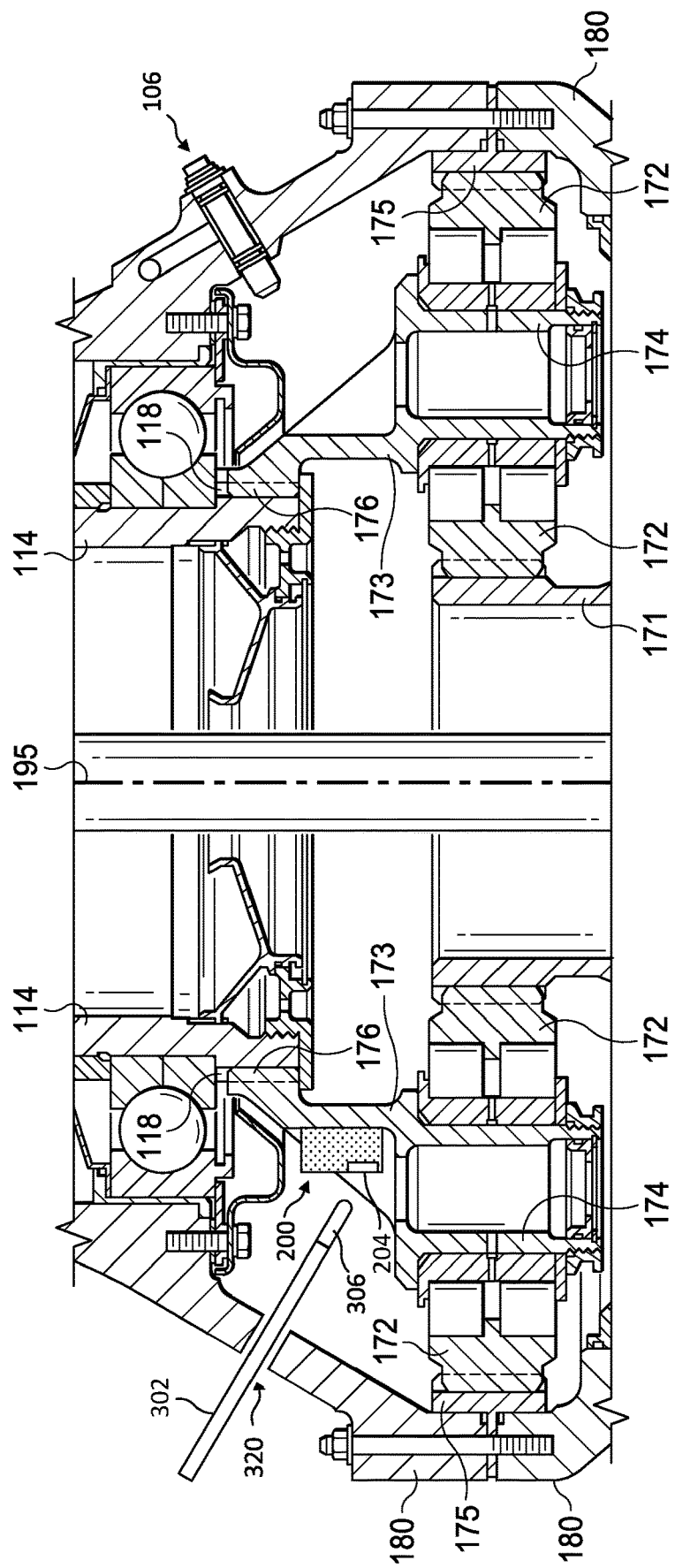

In the embodiment of FIG. 8A, the sensors 200 are accessible through an opening 320 in the gearbox housing 180, which exposes some of the moving features of the gearbox 160. FIG. 8B shows the embodiment of FIG. 8A during use. Each of the sensors 200 may be charged in turn by rotating the planetary carrier 173 to align a respective one of the sensors 200 with the opening 320, inserting the charging unit 300 into the opening 320, and coupling the charging interfaces 204 and 306.

The opening 320 is shown as an example, and in this example, is a dedicated opening for accessing the sensor 200. In some embodiments, the opening 320 may not be a dedicated opening for the sensor. For example, the gearbox housing 180 may have a variety of entry points that allow a maintenance crew to access the planetary gear set 170, such as fluid transfer ports, oil jet ports, or the like, any of which may be used to access the sensors 200. The opening has a longitudinal axis 322 extending through the center of the opening, which may be perpendicular to a major surface of the gearbox housing 180.

The moving features of the gearbox 160 may be rotated to align one of the sensor 200 on (or along) the longitudinal axis 322 such that it crosses or intersects the longitudinal axis 322. In the embodiment show, the planetary carrier 173 is rotated. The sensors 200 and opening 320 are aligned in embodiments where the charging unit 300 omits the camera 308 or light source 310, allowing maintenance crew to locate the sensors 200 without visual aids. The elongated member 302 may be rigid in such embodiments. The sensors 200 and opening 320 may not be aligned in embodiments where the charging unit 300 includes the camera 308 and light source 310, as the visual aid provided by the camera 308 may aid maintenance crew in locating the sensors 200. The elongated member 302 may be flexible or rigid in such embodiments. In such embodiments, the sensors 200 are disposed off the longitudinal axis 322 during charging.

Figure 9A:
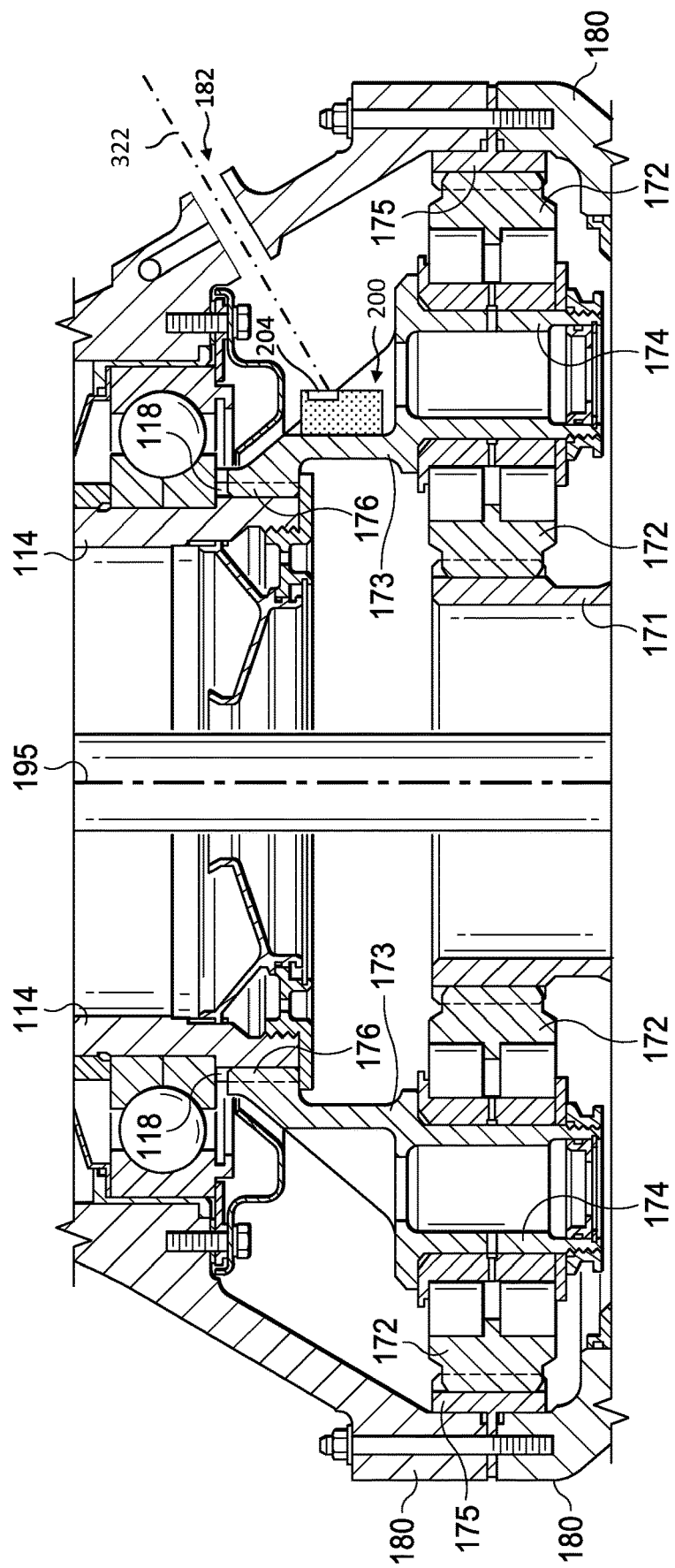
Figure 9B:
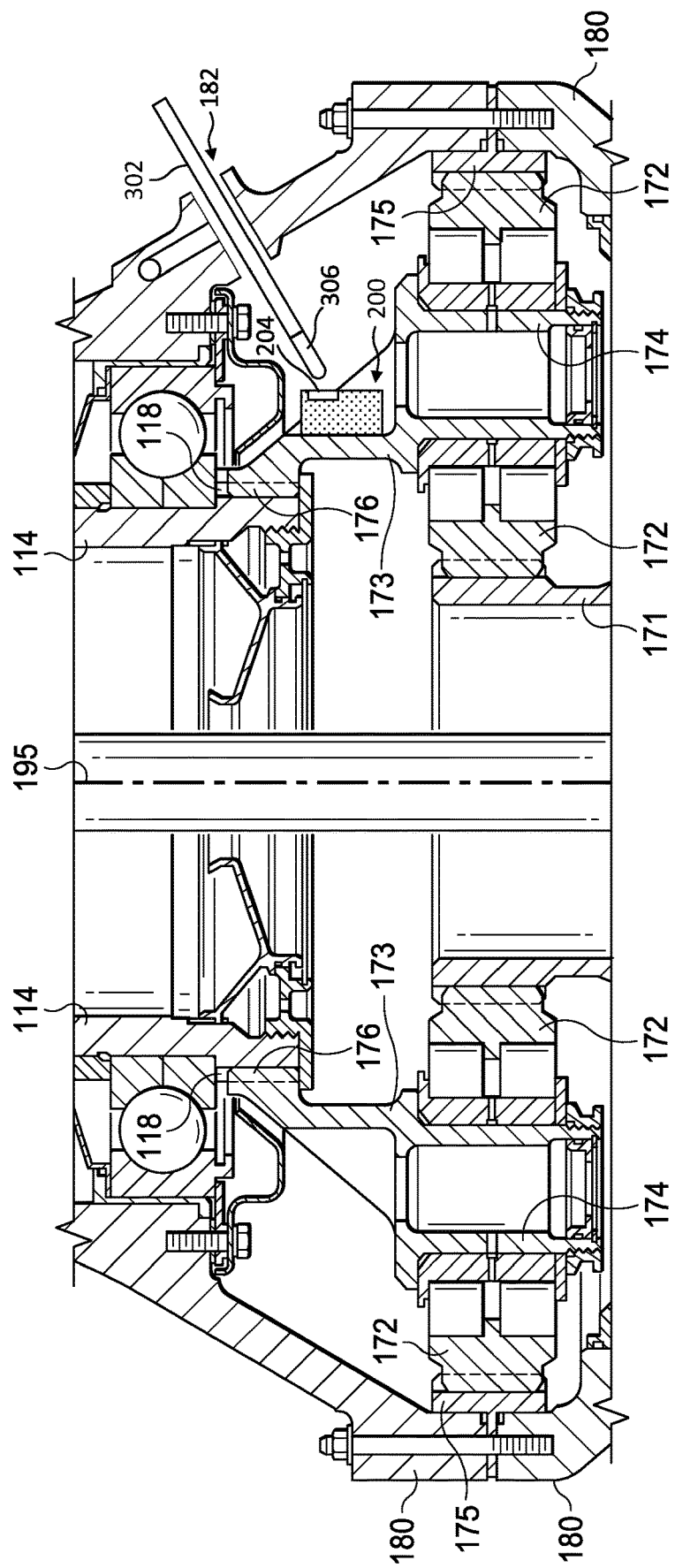

In the embodiment of FIG. 9A, the sensors 200 are accessible through an oil jet port 182 in the gearbox housing 180. The sensors 200 are accessed by removing the oil jet. FIG. 9B shows the embodiment of FIG. 9A during use. Each of the sensors 200 may be charged in turn by rotating the planetary carrier 173 to align a respective one of the sensors 200 with the opening 320, inserting the charging unit 300 into the oil jet port 182, and coupling the charging interfaces 204 and 306.

Figure 10:
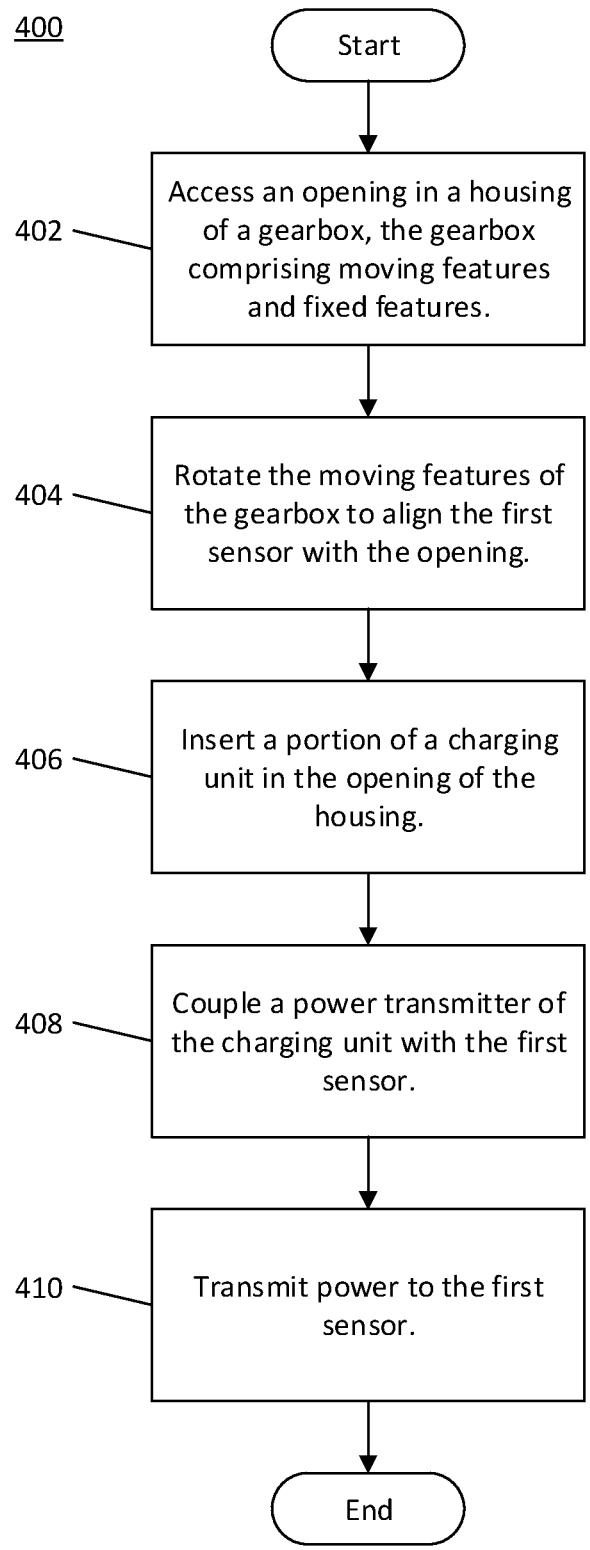
FIG. 10 is a block diagram of a charging method, in accordance with some embodiments.

FIG. 10 is a block diagram of a charging method 400, in accordance with some embodiments. The charging method 400 may be performed by a maintenance crew when charging the sensors 200.

An opening in the housing of the gearbox 160 is accessed (step 402). The opening may be, e.g., the opening 320, the oil jet port 182, or the like. The gearbox 160 has a first sensor 200. The moving features of the gearbox 160 are rotated to align the first sensor 200 with the opening (step 404). The opening may have a longitudinal axis perpendicular to a major surface of the gearbox housing 180. Rotating the moving features may include rotating the moving features (e.g., the planetary gear set 170) of the gearbox 160 until the first sensor 200 is disposed on the longitudinal axis of the opening.

A portion of the charging unit 300 is inserted in the opening of the gearbox housing 180 (step 406). A power transmitter (e.g., the charging interface 306) of the charging unit 300 is then coupled with a first power receiver (e.g., the charging interface 204) of the first sensor 200 (step 408). The coupling may be aided by, e.g., steering the elongated member 302 of the charging unit 300 towards the charging interface 204 of the first sensor 200. The steering may be automated, or may be performed by an operator. Power is the transmitted to the first sensor 200, with the transmitted power charging the first battery 202 of the first sensor 200 (step 410). The power may be transmitted until the first battery 202 is substantially charged. After the first sensor 200 is charged, some of the steps of the charging method 400 may be repeated to charge other sensors 200, such as a second sensor 200. Once the sensors 200 are charged, the opening in the gearbox housing 180 is closed.

Embodiments may achieve advantages. The use of the sensors 200 on the moving features of the gearbox 160 (e.g., the planetary gear set 170) may allow health of the gearbox 160 to be more accurately monitored, and may allow failures of the gearbox 160 to be detected earlier. Because rebuilding the gearbox 160 is a costly maintenance procedure, disassembling the gearbox 160 to charge the batteries of the sensors 200 may be undesirable. Use of the charging unit 300 allows the sensors 200 to be charge without disassembling the gearbox 160, even when the sensors are located in areas of the gearbox 160 that are difficult to reach.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A method comprising:
    accessing an opening in a housing of a gearbox, the gearbox comprising moving features and fixed features, the gearbox further comprising a first sensor disposed on the moving features, the first sensor having a first battery, the gearbox further comprising an input pinion disposed in the housing, the moving features mechanically coupled to the input pinion, the moving features and the input pinion being operable to convert between power and torque;
    rotating the moving features of the gearbox to align the first sensor with the opening;
    inserting a portion of a charging unit in the opening of the housing;
    coupling a power transmitter of the charging unit with a first power receiver of the first sensor; and
    transmitting power to the first sensor, the transmitted power charging the first battery of the first sensor.

2. The method of claim 1, wherein the opening has a longitudinal axis perpendicular to a major surface of the housing, and wherein rotating the moving features of the gearbox comprises:
    rotating the moving features of the gearbox until the first sensor is disposed on the longitudinal axis of the opening.

3. The method of claim 2, wherein the charging unit is a rigid borescope.

4. The method of claim 1, wherein the opening has a longitudinal axis perpendicular to a major surface of the housing, and wherein after rotating the moving features of the gearbox, the first sensor is disposed off the longitudinal axis of the opening.

5. The method of claim 4, wherein the charging unit is an articulating borescope, and further comprising:
    steering the articulating borescope towards the first power receiver of the first sensor, the first sensor having at least one guiding member indicating the location of the first power receiver.

6. The method of claim 1 further comprising:
    while transmitting the power to the first sensor, communicating with the first sensor to determine a charge level and a health status of the first battery.

7. The method of claim 1, wherein the power transmitter of the charging unit and the first power receiver of the first sensor share a direct contact interface.

8. The method of claim 1, wherein the power transmitter of the charging unit and the first power receiver of the first sensor share a non-contact interface.

9. The method of claim 1 further comprising:
    after transmitting the power to the first sensor, rotating the moving features of the gearbox to align a second sensor with the opening, the second sensor having a second battery;
    coupling the power transmitter of the charging unit with a second power receiver of the second sensor; and
    transmitting power to the second sensor, the transmitted power charging the second battery of the second sensor.

10. The method of claim 9 further comprising:
    after transmitting the power to the first sensor and the second sensor, closing the opening in the housing of the gearbox.

11. The method of claim 1, wherein the moving features are operable to rotate about a common axis when rotating the moving features of the gearbox, the first sensor being exposed by the opening as the moving features rotate about the common axis.

12. The method of claim 1, wherein the opening is a dedicated opening for accessing the first sensor.

13. The method of claim 1, wherein the opening is a lubrication port in the housing.

14. The method of claim 1, wherein the first sensor is a vibration sensor.

15. The method of claim 1, wherein the first sensor is a temperature sensor.

16. The method of claim 1, wherein the first sensor is a debris sensor.

17. The method of claim 1, wherein the first sensor is an oil quality sensor.

18. A borescope comprising:
    an elongated member comprising conductive features running down the length of the elongated member;
    a main unit disposed at a first end of the elongated member; and
    a charging head unit disposed at a second end of the elongated member, the charging head unit and the main unit being electrically connected by the conductive features of the elongated member, the charging head unit comprising:
        a power transmitter, the power transmitter being operable to transmit power from the main unit to a sensor;
        a camera, the camera operable to transmit video to the main unit; and
        a light source, the main unit operable to power the light source.

19. The borescope of claim 18, wherein the power transmitter comprises a direct contact charging interface.

20. The borescope of claim 18, wherein the power transmitter comprises a non-contact charging interface.

* * * * *